United States Patent
Reddish et al.

(10) Patent No.: US 10,606,340 B2
(45) Date of Patent: Mar. 31, 2020

(54) APPARATUS, METHODS, COMPUTER PROGRAMS, AND NON-TRANSITORY COMPUTER READABLE STORAGE MEDIUMS FOR ENABLING REMOTE CONTROL OF ONE OR MORE DEVICES

(71) Applicant: ROLLS-ROYCE POWER ENGINEERING PLC, Derby (GB)

(72) Inventors: Stephen G Reddish, Sheffield (GB); Christopher A Freeman, Sheffield (GB); Michael Lewis, Barnsley (GB)

(73) Assignee: ROLLS-ROYCE POWER ENGINEERING PLC, Derby (GB)

( * ) Notice: Subject to any disclaimer, the term of this patent is extended or adjusted under 35 U.S.C. 154(b) by 218 days.

(21) Appl. No.: 15/455,721

(22) Filed: Mar. 10, 2017

(65) Prior Publication Data

US 2017/0293275 A1    Oct. 12, 2017

(30) Foreign Application Priority Data

Apr. 6, 2016    (GB) .................................. 1605835.6

(51) Int. Cl.
*G06F 3/00* (2006.01)
*G06F 3/01* (2006.01)
(Continued)

(52) U.S. Cl.
CPC ................ *G06F 3/00* (2013.01); *G06F 3/005* (2013.01); *G06F 3/011* (2013.01)

(58) Field of Classification Search
CPC ............. G06F 3/00; G06F 3/005; G06F 3/011
See application file for complete search history.

(56) References Cited

U.S. PATENT DOCUMENTS

2003/0179292 A1    9/2003 Provost et al.
2004/0189675 A1*   9/2004 Pretlove ................. B25J 9/1656
                                                        345/633
(Continued)

FOREIGN PATENT DOCUMENTS

EP        2818948 A1    12/2014
JP     2008-107871 A     5/2008
(Continued)

OTHER PUBLICATIONS

Microsoft Research, "Holoportation", http://research.microsoft.com/en-us/projects/holoportation/.
(Continued)

*Primary Examiner* — Thomas C Lee
*Assistant Examiner* — Anzuman Sharmin
(74) *Attorney, Agent, or Firm* — Oliff PLC

(57) ABSTRACT

Apparatus for enabling remote control of one or more devices, the apparatus comprising: a controller configured to: receive position data for a sensed position of an operator within a first volume; control a display located in a second volume, different to the first volume, to display a representation of at least a portion of the operator within a representation of at least a portion of the first volume, using the received position data; receive user input data from a user input device located in the second volume; and control a first device located at the first volume, using the received user input data to perform a first action.

20 Claims, 4 Drawing Sheets

(51) Int. Cl.
*G05B 19/05* (2006.01)
*H04N 7/14* (2006.01)
*G05B 19/418* (2006.01)
*G05B 19/414* (2006.01)

(56) References Cited

U.S. PATENT DOCUMENTS

2013/0231779 A1 9/2013 Purkayastha et al.
2014/0365018 A1* 12/2014 Kusukame ......... G05D 23/1917
  700/276
2017/0061750 A1* 3/2017 Eyring ............. G08B 13/19695

FOREIGN PATENT DOCUMENTS

WO   2009/036782 A1   3/2009
WO   2013/176758 A1   11/2013
WO   2014/208169 A1   12/2014

OTHER PUBLICATIONS

Otto, Michael M. et al., "Towards unbiquitous tracking: Presenting a scalable, markerless tracking approach using multiple depth cameras."
Sep. 22, 2016 Search Report issued in Great Britain Patent Application No. GB1605835.6.

* cited by examiner

US 10,606,340 B2

APPARATUS, METHODS, COMPUTER PROGRAMS, AND NON-TRANSITORY COMPUTER READABLE STORAGE MEDIUMS FOR ENABLING REMOTE CONTROL OF ONE OR MORE DEVICES

TECHNOLOGICAL FIELD

The present disclosure concerns apparatus, methods, computer programs, and non-transitory computer readable storage mediums for enabling remote control of one or more devices.

BACKGROUND

In various industries, operators located within a facility (for example, a factory, a manufacturing facility, or an electrical energy generation plant) may require guidance and/or information from a colleague to assist them with the performance of a task. For example, a technician carrying out a repair on an aerospace component in a repair facility may require guidance from an engineer on how the repair should be performed. At present, the engineer may visit the repair facility to assist the technician. However, this may be relatively costly where the engineer is required to travel between a plurality of facilities, some of which may be located in different cities or countries. The engineer may alternatively deliver instructions and/or information orally via a telephone. However, the instructions delivered by the engineer may be challenging for the technician to follow and/or inaccurate due to the engineer having no visibility of the repair being performed.

BRIEF SUMMARY

According to various examples there is provided apparatus for enabling remote control of one or more devices, the apparatus comprising: a controller configured to: receive position data for a sensed position of an operator within a first volume; control a display located in a second volume, different to the first volume, to display a representation of at least a portion of the operator within a representation of at least a portion of the first volume, using the received position data; receive user input data from a user input device located in the second volume; and control a first device located at the first volume, using the received user input data, to perform a first action.

The first device may comprise a communication device. The first action may include communicating information to the operator.

The first device may comprise a projector or a display. The first action may include displaying the information to the operator.

The first device may comprise an electroacoustic transducer. The first action may include providing acoustic waves to the operator to convey the information to the operator.

The first action may include physical movement of part, or all, of the first device. For example, the first device may include, or be coupled to, one or more actuators (such as one or more servomotors) for moving part, or all, of the first device.

The first device may comprise a laser. The first action may include orienting and activating the laser to emit a laser beam towards a target.

The first device may comprise a robot. The first action may include operating the robot.

The controller may be configured to control a second device at the first volume, using the received user input data, to perform a second action, different to the first action.

The display may comprise a virtual reality (VR) headset.

The controller may be configured to receive environment data associated with the first volume.

The controller may be configured to: receive further user input data requesting information concerning a process to be performed by the operator; retrieve process information using the further user input data; and control the display to display the retrieved process information.

The controller may be configured to: receive additional user input data requesting a computer aided design (CAD) model of an article located within the first volume; retrieve the requested computer aided design (CAD) model using the additional user input data: and control the display to display at least a part of the retrieved computer aided design (CAD) model.

The controller may be configured to store the received position data and the received user input data in a memory.

The first volume may be at least a part of a manufacturing facility or at least a part of an electrical energy generation plant.

The operator may be a human or a robot.

According to various examples there is provided a method of enabling remote control of one or more devices, the method comprising: receiving position data for a sensed position of an operator within a first volume; controlling a display located in a second volume, different to the first volume, to display a representation of at least a portion of the operator within a representation of at least a portion of the first volume, using the received position data; receiving user input data from a user input device located in the second volume; and controlling a first device located at the first volume, using the received user input data, to perform a first action.

The first device may comprise a communication device. Controlling the first device may include controlling communication of information to the operator.

The first device may comprise a projector or a display. Controlling the first device may include controlling display of the information to the operator.

The first device may comprise an electroacoustic transducer. Controlling the first device may include controlling provision of acoustic waves to the operator to convey the information to the operator.

The first action may include physical movement of part, or all, of the first device.

The first device may comprise a laser. The first action may include orienting and activating the laser to emit a laser beam towards a target.

The first device may comprise a robot. The first action may include operating the robot.

The method may further comprise controlling a second device at the first volume, using the received user input data, to perform a second action, different to the first action.

The display may comprise a virtual reality (VR) headset.

The method may further comprise receiving environment data associated with the first volume.

The method may further comprise: receiving further user input data requesting information concerning a process to be performed by the operator; retrieving process information using the further user input data; and controlling the display to display the retrieved process information, The method may further comprise: receiving additional user input data requesting a computer aided design (CAD) model of an article located within the first volume; retrieving the requested computer aided design (CAD) model using the additional user input data; and controlling the display to display at least a part of the retrieved computer aided design (CAD) model.

The method may further comprise controlling storage of the received position data and the received user input data in a memory.

The first volume may be at least a part of a manufacturing facility or at least a part of an electrical energy generation plant.

The operator may be a human or a robot.

According to various examples there is provided a computer program that, when read by a computer, causes performance of the method as described in any of the preceding paragraphs.

According to various examples there is provided a non-transitory computer readable storage medium comprising: computer readable instructions that, when read by a computer, cause performance of the method as described in any of the preceding paragraphs.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

BRIEF DESCRIPTION

Embodiments will now be described by way of example only, with reference to the Figures, in which.

DETAILED DESCRIPTION

In the following description, the terms 'connected' and 'coupled' mean operationally connected and coupled. It should be appreciated that there may be any number of intervening components between the mentioned features, including no intervening components.

Figure 1:
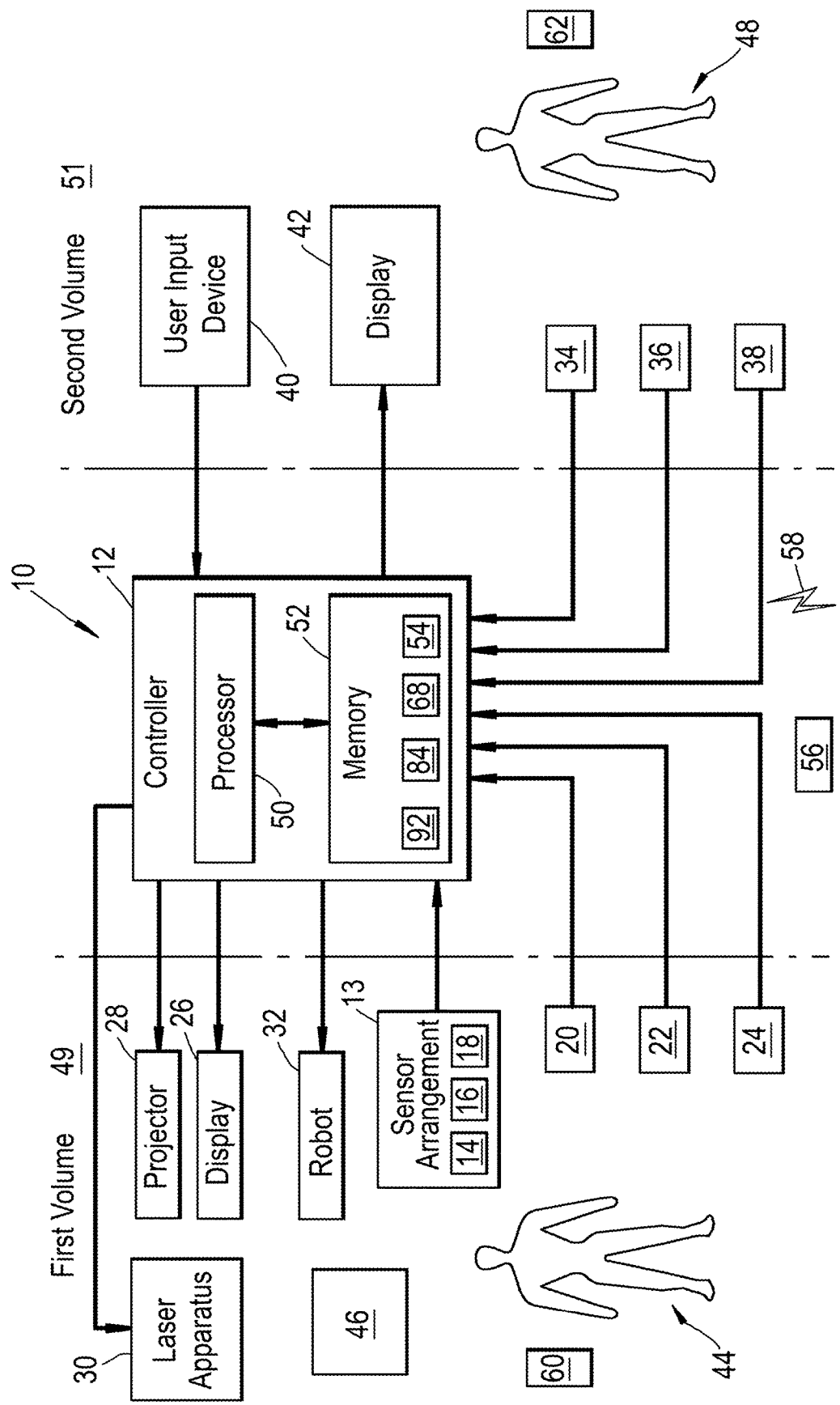
FIG. 1 illustrates a schematic diagram of apparatus for enabling remote control of one or more devices according to various examples.

FIG. 1 illustrates a schematic diagram of apparatus 10 according to various examples. The apparatus includes a controller 12, a sensor arrangement 13 (including a first sensor 14, a second sensor 16, and a third sensor 18), a fourth sensor 20, a fifth sensor 22, a sixth sensor 24, a display 26, a projector 28, a laser apparatus 30, a robot 32, a seventh sensor 34, an eighth sensor 36, a ninth sensor 38, a user input device 40, and a display 42. FIG. 1 also illustrates an operator 44, an article 46, and a user 48.

In some examples, the apparatus 10 may be a module. As used herein, the wording 'module' refers to a device or apparatus where one or more features are included at a later time and, possibly, by another manufacturer or by an end user. For example, where the apparatus 10 is a module, the apparatus 10 may only include the controller 12, and the remaining features may be added by another manufacturer, or by an end user.

The sensor arrangement 13, the fourth sensor 20, the fifth sensor 22, the sixth sensor 24, the display 26, the projector 28, the laser apparatus 30, the robot 32, the operator 44 and the article 46 are located within or at a first volume 49. By way of an example, the first volume 49 may be at least a part of a manufacturing facility, at least a part of an electrical energy generation plant, or at least a part of a factory.

The seventh sensor 34, the eighth sensor 36, the ninth sensor 38, the user input device 40, the display 42, and the user 48 are located within, or at, a second volume 51. The second volume 51 is different to the first volume 49 and may be located in a different part of a building to the first volume 49; may be located in a different building to the first volume 49, may be located in a different part of a country to the first volume 49, or may be located in a different country to the first volume 49.

The controller 12 may be located in the first volume 49, or may be located in the second volume 51, or may be located in a different volume to the first volume 49 and the second volume 51 (that is, the controller 12 may be located in third volume). For example, the controller 12 may be located in a different building, or may be located in a different part of a country, or may be located in a different country to the first volume 49 and/or the second volume 51. The controller 12 may be located at a single location, or may be distributed across a plurality of locations.

The controller 12, the sensor arrangement 13, the fourth sensor 20, the fifth sensor 22, the sixth sensor 24, the display 26, the projector 28, the laser apparatus 30, the robot 32, the seventh sensor 34, the eighth sensor 36, the ninth sensor 38, the user input device 40, and the display 42 may be coupled to one another via a wireless link and may consequently comprise transceiver circuitry and one or more antennas. Additionally or alternatively, the controller 12, the sensor arrangement 13, the fourth sensor 20, the fifth sensor 22, the sixth sensor 24, the display 26, the projector 28, the laser apparatus 30, the robot 32, the seventh sensor 34, the eighth sensor 36, the ninth sensor 38, the user input device 40, and the display 42 may be coupled to one another via a wired link and may consequently comprise interface circuitry (such as a Universal Serial Bus (USB) socket). It should be appreciated that the controller 12, the sensor arrangement 13, the fourth sensor 20, the fifth sensor 22, the sixth sensor 24, the display 26, the projector 28, the laser apparatus 30, the robot 32, the seventh sensor 34, the eighth sensor 36, the ninth sensor 38, the user input device 40, and the display 42 may be coupled to one another via any combination of wired and wireless links.

Figure 2:
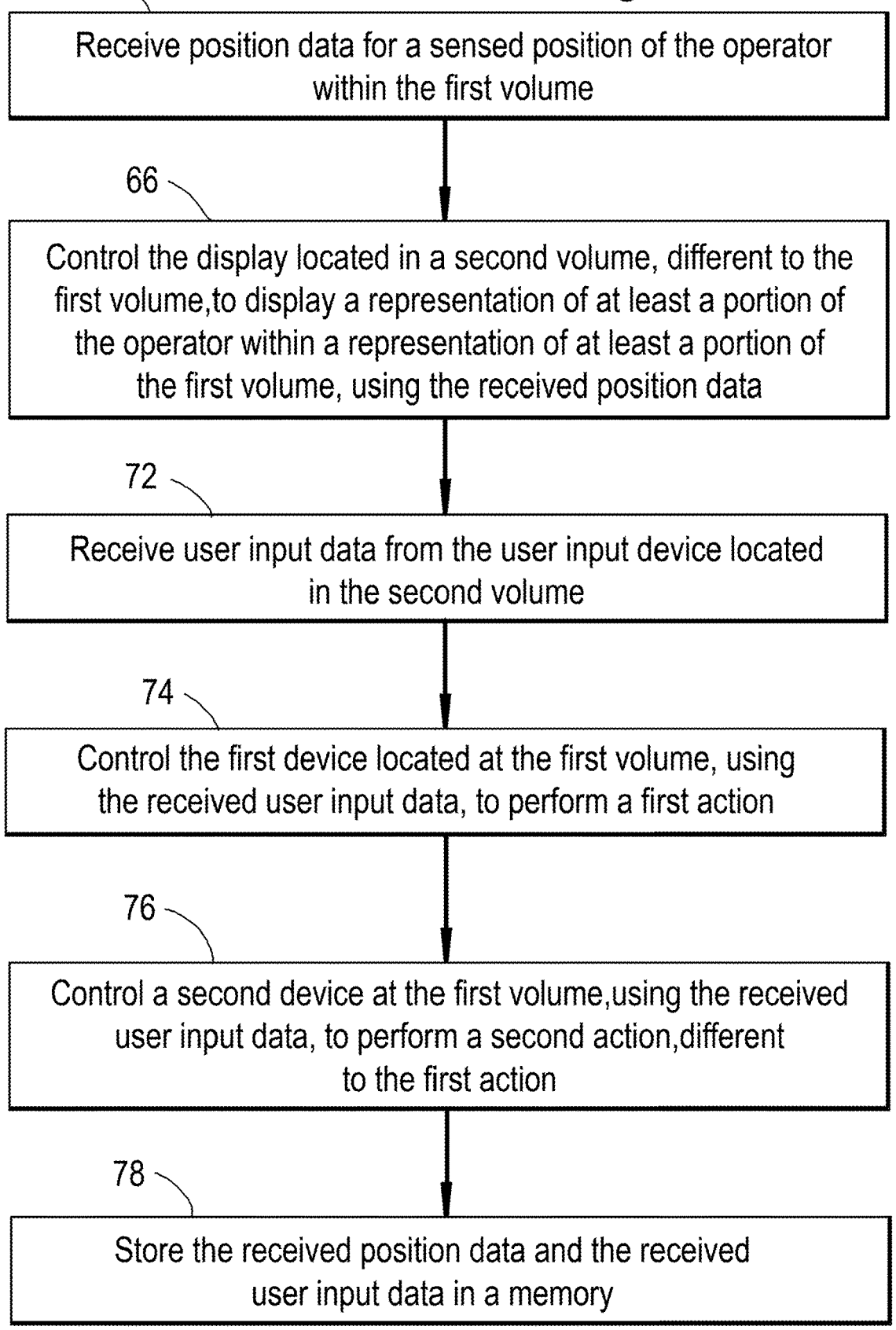
FIG. 2 illustrates a flow diagram of a method of enabling remote control of one or more device according to various examples.
Figure 4:
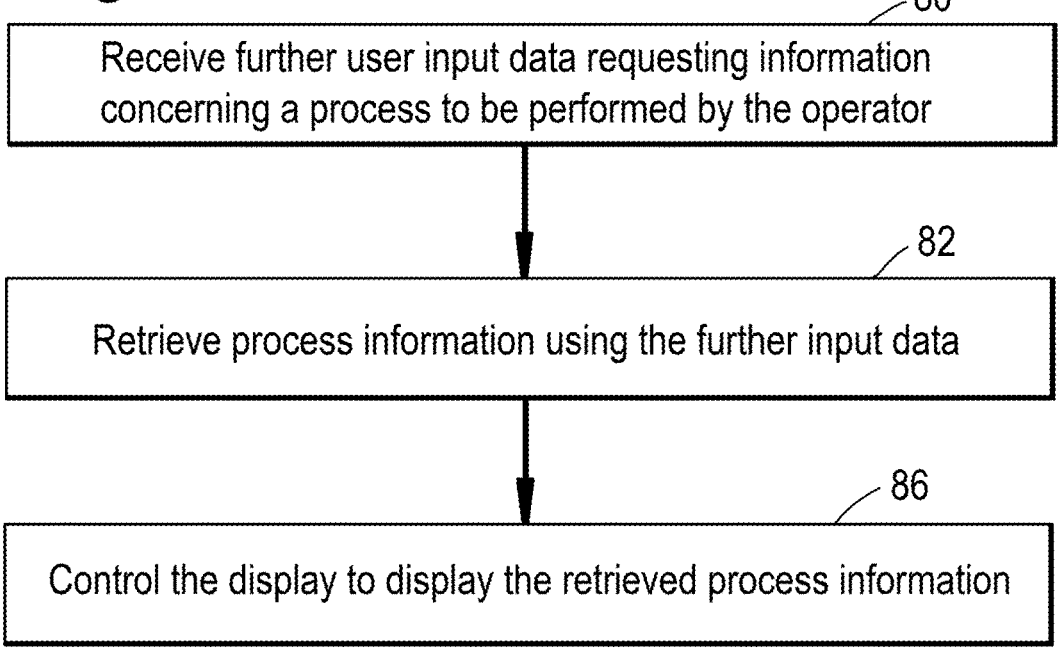
FIG. 4 illustrates a flow diagram of another method according to various examples.
Figure 5:
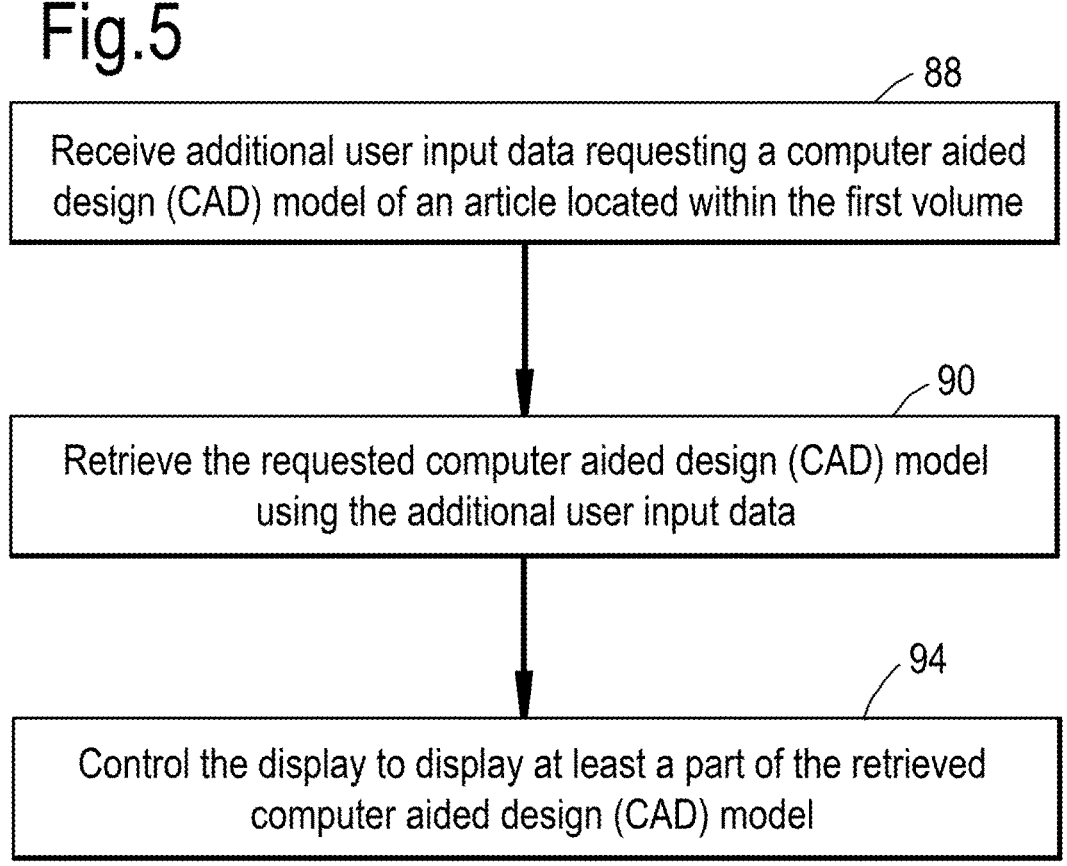
FIG. 5 illustrates a flow diagram of a further method according to various examples.

The controller 12 may comprise any suitable circuitry to cause performance of the methods described herein and as illustrated in FIGS. 2, 4, and 5. The controller 12 may comprise: control circuitry: and/or processor circuitry; and/or at least one application specific integrated circuit (ASIC); and/or at least one field programmable gate array (FPGA); and/or single or multi-processor architectures; and/or sequential/parallel architectures; and/or at least one programmable logic controllers (PLCs); and/or at least one microprocessor; and/or at least one microcontroller; and/or a central processing unit (CPU); and/or a graphics processing unit (GPU), to perform the methods.

In various examples, the controller 12 may comprise at least one processor 50 and at least one memory 52. The memory 52 stores a computer program 54 comprising computer readable instructions that, when read by the processor

50, causes performance of the methods described herein, and as illustrated in FIGS. 2, 4, and 5. The computer program 54 may be software or firmware, or may be a combination of software and firmware.

The processor 50 may include at least one microprocessor and may comprise a single core processor, may comprise multiple processor cores (such as a dual core processor or a quad core processor), or may comprise a plurality of processors (at least one of which may comprise multiple processor cores), The memory 52 may be any suitable non-transitory computer readable storage medium, data storage device or devices, and may comprise a hard disk and/or solid state memory (such as flash memory). The memory 52 may be permanent non-removable memory, or may be removable memory (such as a universal serial bus (USB) flash drive or a secure digital card). The memory may include: local memory employed during actual execution of the computer program; bulk storage: and cache memories which provide temporary storage of at least some computer readable or computer usable program code to reduce the number of times code may be retrieved from bulk storage during execution of the code.

The computer program 54 may be stored on a non-transitory computer readable storage medium 56. The computer program 54 may be transferred from the non-transitory computer readable storage medium 56 to the memory 52. The non-transitory computer readable storage medium 56 may be, for example, a USB flash drive, a secure digital (SD) card, an optical disc (such as a compact disc (CD), a digital versatile disc (DVD) or a Blu-ray disc). In some examples, the computer program 54 may be transferred to the memory 52 via a signal 58 (which may be a wireless signal or a wired signal).

Input/output devices may be coupled to the controller 12 either directly or through intervening input/output controllers. Various communication adaptors may also be coupled to the controller 12 to enable the apparatus 10 to become coupled to other apparatus or remote printers or storage devices through intervening private or public networks. Non-limiting examples include modems and network adaptors of such communication adaptors.

The sensor arrangement 13 is configured to sense at least the position of at least the operator 44 within the first volume 49. The first sensor 14, the second sensor 16 and the third sensor 18 may comprise any suitable sensor, or sensors, for sensing the position of the operator 44. For example, the first sensor 14, the second sensor 16, and the third sensor 18 may be provided by any combination of three dimensional (3D) laser scanners, infrared sensors, and digital cameras (comprising charge coupled device (CCD) sensors, and/or complementary metal oxide semiconductor (CMOS) sensors). In some examples, the first sensor 14, the second sensor 16, and the third sensor 18 may be Microsoft Kinect v2 sensors. The first sensor 14, the second sensor 16, and the third sensor 18 may be positioned at various different locations within and/or around the first volume 49 to sense the position of at least the operator 44. The controller 12 is configured to receive position data from the sensor arrangement 13.

It should be appreciated that the sensor arrangement 13 may include any number of sensors and the sensor arrangement 13 is not limited to only comprising the first sensor 14, the second sensor 16 and the third sensor 18. For example, the sensor arrangement 13 may only include a single sensor that may be fixed, or moveable within or around the first volume 49. In other examples, the sensor arrangement 13 may comprise a relatively large number of sensors (ten or more sensors for example) that are positioned around the perimeter of the first volume 49.

The fourth sensor 20, the fifth sensor 22 and the sixth sensor 24 are configured to sense one or more environment parameters associated with the first volume 49. For example, the fourth sensor 20, the fifth sensor 22 and the sixth sensor 24 may be any combination of digital thermometers, radiation sensors (such as Geiger counters for example), gas detectors (for example, a carbon dioxide detector or a carbon monoxide detector), and humidity sensors. The controller 12 is configured to receive environment data from the fourth sensor 20, the fifth sensor 22 and the sixth sensor 24.

It should be appreciated that the apparatus 10 may include more or less environment sensors than the fourth sensor 20, the fifth sensor 22 and the sixth sensor 24. In some examples, the apparatus 10 may not include any environment sensors.

The display 26 may be any suitable device for displaying information to the operator 44. For example, the display 26 may comprise a liquid crystal display (LCD), a light emitting diode (LED) display (such as an active matrix organic light emitting diode (AMOLED) display), a thin film transistor (TFT) display, or a plasma display. The display 26 may be static within the first volume 49 (for example, the display 26 may be mounted on a wall or on a desk) or may be moveable within the first volume 49. For example, the display 26 may be integrated within a headset or spectacles worn by the operator 44 and may be configured to provide an augmented reality experience for the operator 44. The controller 12 is configured to control the display 26 to display information.

The projector 28 is configured to display information to the operator 44 via a two dimensional (2D) image or via a holographic image. The controller 12 is configured to control the operation of the projector 28 to display information.

The laser apparatus 30 may comprise a laser and one or more actuators for changing the orientation and/or position of the laser. The controller 12 is configured to control the operation of the laser apparatus 30. For example, the controller 12 may activate and deactivate the laser and may re-orient and re-position the laser.

The robot 32 may be configured to perform various actions. For example, the robot 32 may comprise one or more machine tools for machining the article 46, and/or one or more digital cameras for obtaining images of the article 46, and/or one or more pointing devices for pointing to a part of the article 46. The controller 12 is configured to control the operation of the robot 32.

The operator 44 may be a human or may be a robot. For example, the operator 44 may be a person involved in the repair, manufacture, inspection, or assembly of the article 46. By way of another example, the operator 44 may be an autonomous robot or a semi-autonomous robot involved in the repair, manufacture, inspection or assembly of the article 46. In some examples, there may be a plurality of operators 44 within the first volume 49.

The apparatus 10 may additionally include a first electroacoustic transducer 60 located within the first volume 49, and a second electroacoustic transducer 62 located within the second volume 51. The first and second electroacoustic transducers 60, 62 may be any combination of: landline' telephones (that is, telephones connected to a public switched telephone network); mobile cellular telephones; and voice over Internet protocol (VoIP) devices. The operator 44 and the user 48 may use the first and second electroacoustic transducers 60, 62 respectively to communicate with one another. In various examples, the first and second electroacoustic transducers 60, 62 may communicate via the controller 12, and the controller 12 may store a recording of the conversation in the memory 52.

The seventh sensor 34, the eighth sensor 36, and the ninth sensor 38 may comprise any suitable sensor or sensors for obtaining images and/or position data of the user 48. For example, the sensors 34, 36, 38 may include any combination of digital cameras, infrared sensors, lasers, virtual reality peripheral network (VRPN) devices. In some examples, the sensors 34, 36, 38 may include a plurality of Kinect v2 sensors. The controller 12 is configured to receive the image data and/or the position data from the sensors 34, 36, 38.

The user input device 40 may comprise any suitable device or devices for enabling the user 48 to provide an input to the controller 12. For example, the user input device may comprise one or more of a keyboard, a keypad, a touchpad, a touchscreen display, and a computer mouse. The controller 12 is configured to receive signals from the user input device 40.

The display 42 may be any suitable device for displaying information to the user 48. For example, the display 42 may include one or more of: a liquid crystal display (LCD), a light emitting diode (LED) display (such as an active matrix organic light emitting diode (AMOLED) display), a thin film transistor (TFT) display, or a plasma display. The display 42 may be static within the second volume 51 (for example, the display 42 may be mounted on a wall or on a desk) or may be moveable within the second volume 51 (for example, the display 42 may be integrated within a headset or spectacles worn by the user 48). In some examples, the display 42 may be integrated within a virtual reality headset that may be worn by the user 48. The controller 12 is configured to control the display 42 to display information.

The user 48 is a human located within the second volume 51 and may be an expert on the activities being performed within the first volume 49 by the operator 44. For example, where the first volume 49 is at least a part of an aerospace facility, the user 48 may be an aerospace engineer. In some examples, there may be a plurality of users 48 within the second volume 51, each using a user input device 40 and a display 42.

The operation of the apparatus 10 is described in the following paragraphs with reference to FIGS. 2 to 5.

At block 64, the method includes receiving position data for a sensed position of the operator 44 within the first volume 49. For example, the controller 12 may receive position data of the operator 44 and the article 46 within the first volume 49 from the sensor arrangement 13. The controller 12 may also receive environment data from one or more of the fourth sensor 20, the fifth sensor 22 and the sixth sensor 24 at block 64.

At block 66, the method includes controlling the display 42 located in the second volume 51 to display a representation of at least a portion of the operator 44 within a representation of at least a portion of the first volume 49 using the position data received at block 64. For example, the controller 12 may read data 68 stored in the memory 52 that defines a three dimensional model of the first volume 49. The controller 12 may then use the data received at block 64 to determine the position of the operator 44 and the article 46 within the three dimensional model of the first volume 49. The controller 12 may then control the display 42 to display a representation of the operator 44 and a representation of the article 46 within a representation of the first volume 49.

In some examples, the controller 12 may be configured to determine the position of a plurality of body parts of the operator 44 from the position data received at block 44. For example, where the sensor arrangement 13 includes a plurality of Kinect v2 sensors, the controller 12 may determine the positioning and orientation of the various body parts of the operator 44 and then control the display 42 so that the body parts are accurately positioned and oriented in the representation of the first volume 49. The user 48 may view the display 42 to view at least the representation of the operator 44 within the representation of the first volume 49.

Figure 3:
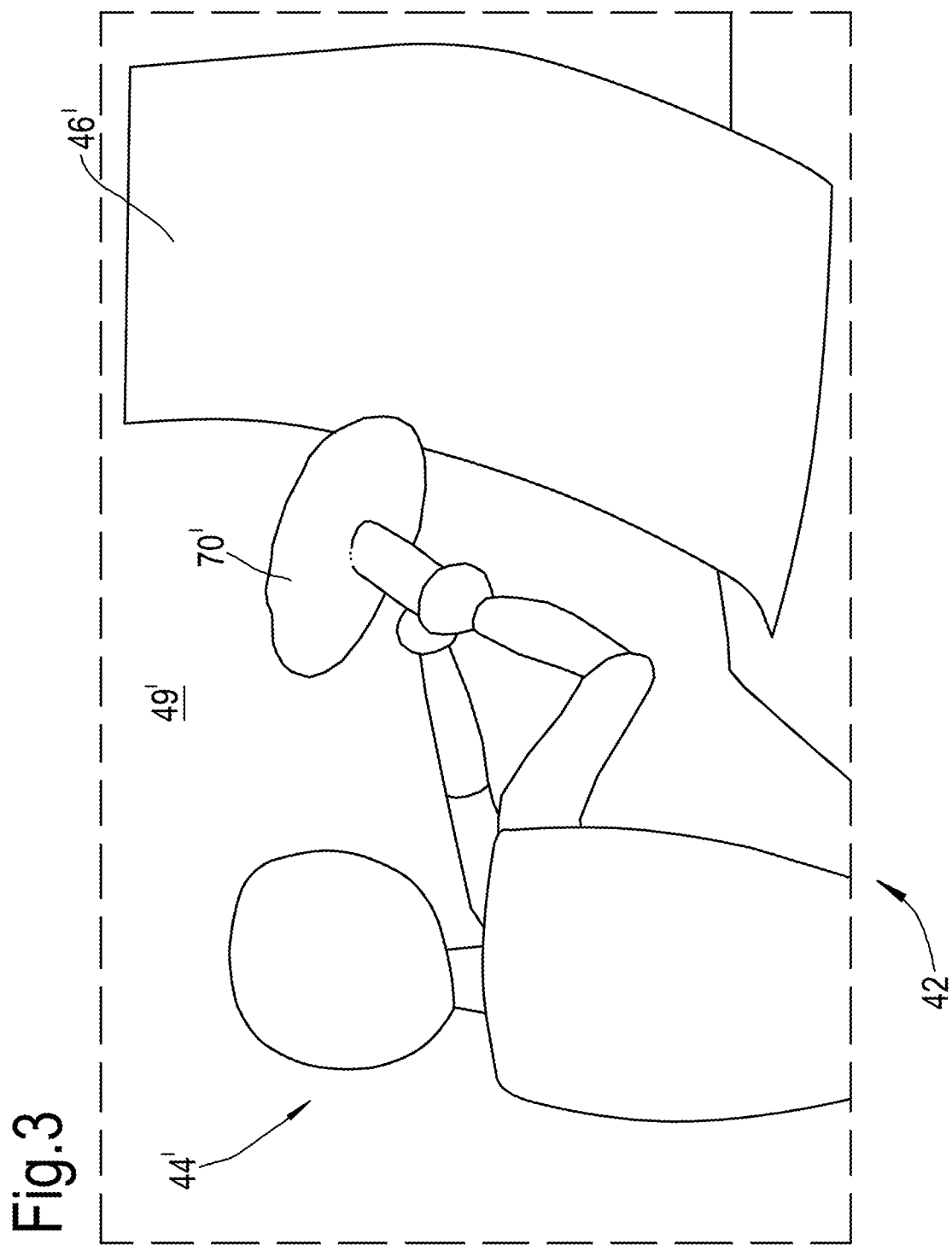
FIG. 3 illustrates an example output from the display within the second volume illustrated in FIG. 1.

FIG. 3 illustrates an example output from the display 42 within the second volume 51. The output includes a representation 49' of the first volume 49, a representation 44' of the operator 44 (which may also be referred to as an avatar), a representation 46' of the article 46 (a fan blade in this example), and a representation 70' of a machine tool (a linishing wheel in this example). The position and orientation of the representations 44', 46', 70' within the representation 49' of the first volume 49 accurately correspond to the position and orientation of the operator 44, the article 46 and the machine tool 70.

It should be appreciated that blocks 64 and 66 may be performed at a frequency so that at least the representation of the operator 44 is perceived as being updated continuously in the output of the display 42 by the user 48. For example, blocks 64 and 66 may be performed at a frequency of sixty hertz or higher so that the user 48 perceives the representation 44' of the operator 44 to move fluidly.

At block 72, the method includes receiving user input data from the user input device 40 located in the second volume 51. For example, the controller 12 may receive the user input data from the user input device 40.

The user 48 may operate the user input device 40 in order to change the view displayed in the display 42. For example, the user 48 may control the user input device 40 to zoom the view in or out, move the view laterally, or rotate the view displayed in the display 42. The controller 12 may receive the user input data and then control the display 40 to display an updated view of the representations of the first volume 49 and the operator 44 in accordance with the input to the user input device 40.

At block 74, the method includes controlling a first device located at the first volume 49, using the user input data received at block 72, to perform a first action. For example, the controller 12 may control a first device located at the first volume 49 to present information to the operator 44 and/or to instruct the operator 44, and/or to manipulate one or more articles within the first volume 49.

For example, the controller 12 may use the received user input data to control the display 26 to display information to the operator 44. Where the display 26 is a head mounted display, the controller 12 may control the display 26 to overlay one or more images in the operators 44 field of vision so that the operator 44 experiences augmented reality. For example, the controller 12 may control the display 26 to overlay an arrow image in the field of vision of the operator 44, indicating a location where the operator 44 should perform machining. By way of a further example, the controller 12 may control the display 26 to display prerecorded images of an operator performing a task to educate the operator 44 on how to perform that task.

By way of another example, the controller 12 may use the received user input data to control the projector 28 to project images to display information to the operator 44.

By way of a further example, the controller 12 may use the received user input data to control the operation of the laser apparatus 30. For example, the controller 12 may control an actuator (such as one or more servomotors) of the laser apparatus 30 to orient the laser in a direction specified by the user input data, and then activate the laser to emit a laser beam towards a target. In various examples, the emitted laser beam may be targeted towards a location on the article 46 that the operator 44 is to inspect and/or machine.

By way of another example, the controller 12 may use the received user input data to control the operation of the robot 32. For example, the controller 12 may control the robot 32 to perform machining on the article 46, and/or obtain images of the article 46, and/or control one or more pointing devices of the robot 32 for pointing to a part of the article 46 to direct the actions of the operator 44.

At block 76, the method may include controlling a second device at the first volume 49, using the received user input data, to perform a second action, different to the first action. For example, the controller 12 may control any one of: the display 26, the projector 28, the laser apparatus 30, and the robot 32 as described in the preceding paragraphs.

It should be appreciated that at block 76, the method may include controlling a plurality of devices at the first volume 49, using the received user input data, to perform a variety of actions. For example, the controller 12 may control the display 26, the projector 28, the laser apparatus 30, and the robot 32 using the received user input data at blocks 74 and 76.

At block 78, the method includes storing the received position data and the received user input data in a memory. For example, the controller 12 may store the position data received at block 66 and the user input data received at block 72 in the memory 52.

In some examples, the seventh sensor 34, the eighth sensor 36, and the ninth sensor 38 may provide user input data to the controller 12 in addition to, or instead of, the user input device 40 (and consequently, the sensors 34, 36, 38 may be referred to as a user input device). Where the seventh sensor 34, the eighth sensor 36 and the ninth sensor 38 include Kinect v2 sensors or other virtual reality peripheral network (VRPN) devices, the user 48 may perform various gestures to provide user input data to the controller 12 and thereby control devices within or at the first volume 49. For example, the user 48 may perform gestures to control the orientation of the laser apparatus 30 and thus select the location where the laser beam is targeted.

The method may then return to block 72 or may end.

FIG. 4 illustrates a flow diagram of another method according to various examples.

At block 80, the method includes receiving further user input data requesting information concerning a process to be performed by the operator 44. For example, the controller 12 may receive further user input data from the user input device 40 (and/or the sensors 34, 36, 38) requesting information concerning a process to be performed by the operator 44. By way of an example, the user 48 may receive a telephone call from the operator 44 asking for assistance with a process. The user 48 may then operate the user input device 40 to request information from an enterprise resource planning (ERP) tool.

In some examples, block 80 may additionally or alternatively include receiving further user input data requesting information from a centrally stored database. For example, the user 48 may operate the user input device 40 to request finite element analysis (FEA) results or product life cycle management (PLM) data.

At block 82, the method includes retrieving information using the further user input data received at block 82. For example, the controller 12 may retrieve information 84 (such as process information) stored in the memory 52 or in remote memory (cloud storage for example).

At block 86, the method includes controlling the display 42 to display the retrieved information. For example, the controller 12 may control the display 42 to display the retrieved process information to the user 48. The user 48 may subsequently provide instructions to the operator 44 (for example, via the display 26) using the retrieved process information to assist the operator 44 with a task (as described in the preceding paragraphs with reference to blocks 72, 74, 76).

FIG. 5 illustrates a flow diagram of a further method according to various examples.

At block 88, the method includes receiving additional user input data requesting a computer aided design (CAD) model of an article located with the first volume 49. For example, the controller 12 may receive additional user input data from the user input device 40 (and/or the sensors 34, 36, 38) requesting a CAD model of the article 46 located within the first volume 49. By way of an example, the user 48 may wish to learn the internal structure of the article 46 in the first volume 49 and may operate the user input device 40 to request a CAD file of the article 46 from the controller 12.

At block 90, the method includes retrieving the requested computer aided design (CAD) model using the additional user input data. For example, the controller 12 may retrieve a computer aided design model 92 of the article 46 from the memory 52 or from remote memory.

At block 94, the method includes controlling the display 42 to display at least a part of the retrieved computer aided design (CAD) model. For example, the controller 12 may control the display 42 to display the CAD model 92 retrieved at block 90. The user 48 may subsequently provide instructions to the operator 44 (for example, via the display 26) using the retrieved CAD model (for example, to inform the operator 44 of the internal structure of the article 46).

The apparatus 10 may provide several advantages. First, the apparatus 10 may enable the user 48 to remotely view the actions of the operator 44 within the first volume 49 in real time and then remotely provide information and/or instructions to the operator 44 via one or more devices within the first volume 49. Second, the apparatus 10 may enable the user 48 to remotely manipulate physical objects in the first volume 49 using the robot 32. This may be particularly advantageous where the first volume 49 is an inhospitable environment (such as nuclear hot cell). In such examples, the robot 32 may be the operator 44. Third, the apparatus 10 may enable the user 48 to view a wealth of information (such as processes, data, CAD models and so on) and then share that information with the operator 44 in a condensed format. Fourth, the apparatus 10 may store data (such as the position data of the operator 44 and/or the user 48) in the memory 52 or in remote memory to record best practice and enable a review of the quality of the actions taken.

It will be understood that the invention is not limited to the embodiments above-described and various modifications and improvements can be made without departing from the concepts described herein. For example, the different embodiments may take the form of an entirely hardware embodiment, an entirely software embodiment, or an embodiment containing both hardware and software elements. By way of a further example, the controller 12 may be distributed and include a sensor server for collating the data from at least the sensor arrangement 13, and a virtual environment server for generating the output of the display 42 and to receive data from the user input device 40, the seventh sensor 34, the eighth sensor 36, and the ninth sensor 38.

Except where mutually exclusive, any of the features may be employed separately or in combination with any other features and the disclosure extends to and includes all combinations and sub-combinations of one or more features described herein.

What is claimed is:

1. An apparatus for enabling remote control of one or more devices, the apparatus comprising:
    a controller configured to:
        read data stored in a memory that defines a three dimensional model of a first volume;
        receive position data for a sensed position of an operator within the first volume;
        determine the position of the operator within the three dimensional model of the first volume using the received position data;
        control a display located in a second volume, different to the first volume, to display a representation of at least a portion of the operator within a representation of at least a portion of the first volume, using the determined position of the operator within the three dimensional model of the first volume, wherein the position and orientation of the representation of the portion of the operator within the representation of the portion of the first volume correspond to the position and orientation of the operator within the first volume;
        determine positions and orientations of a plurality of body parts of the operator, the representation of the portion of the operator is displayed such that positions and orientations of a corresponding plurality of body parts of the representation of the portion of the operator are displayed in correspondence to the determined positions and orientations of the plurality of body parts of the operator;
        receive user input data from a user input device located in the second volume; and
        control a first device located at the first volume, using the received user input data, to perform a first action.

2. The apparatus as claimed in claim 1, wherein the first device includes a communication device, and the first action includes communicating information to the operator.

3. The apparatus as claimed in claim 1, wherein the first device includes a projector or a display, and the first action includes displaying information to the operator.

4. The apparatus as claimed in claim 1, wherein the first device includes an electroacoustic transducer, and the first action includes providing acoustic waves to the operator to convey information to the operator.

5. The apparatus as claimed in claim 1, wherein the first action includes physical movement of part, or all, of the first device.

6. An apparatus for enabling remote control of one or more devices, the apparatus comprising:
    a controller configured to:
        read data stored in a memory that defines a three dimensional model of a first volume;
        receive position data for a sensed position of an operator within the first volume;
        determine the position of the operator within the three dimensional model of the first volume using the received position data;
        control a display located in a second volume, different to the first volume, to display a representation of at least a portion of the operator within a representation of at least a portion of the first volume, using the determined position of the operator within the three dimensional model of the first volume, wherein the position and orientation of the representation of the portion of the operator within the representation of the portion of the first volume correspond to the position and orientation of the operator within the first volume;
        receive user input data from a user input device located in the second volume; and
        control a first device located at the first volume, using the received user input data, to perform a first action, wherein
            the first device includes a laser, and the first action includes orienting and activating the laser to emit a laser beam towards a target.

7. The apparatus as claimed in claim 1, wherein the first device includes a robot, and the first action includes operating the robot.

8. The apparatus as claimed in claim 1, wherein the controller is configured to control a second device at the first volume, using the received user input data, to perform a second action, different to the first action.

9. The apparatus as claimed in claim 1, wherein the display includes a virtual reality (VR) headset.

10. The apparatus as claimed in claim 1, wherein the controller is configured to receive environment data associated with the first volume.

11. The apparatus as claimed in claim 1, wherein the controller is configured to:
    receive further user input data requesting information concerning a process to be performed by the operator;
    retrieve process information using the further user input data; and
    control the display to display the retrieved process information.

12. The apparatus as claimed in claim 1, wherein the controller is configured to:
    receive additional user input data requesting a computer aided design (CAD) model of an article located within the first volume;
    retrieve the requested computer aided design (CAD) model using the additional user input data; and
    control the display to display at least a part of the retrieved computer aided design (CAD) model.

13. The apparatus as claimed in claim 1, wherein the controller is configured to store the received position data and the received user input data in the memory.

14. The apparatus as claimed in claim 1, wherein the first volume is at least a part of a manufacturing facility or at least a part of an electrical energy generation plant.

15. A method of enabling remote control of one or more devices, the method comprising:
    reading data stored in a memory that defines a three dimensional model of a first volume;
    receiving position data for a sensed position of an operator within the first volume;
    determining the position of the operator within the three dimensional model of the first volume using the received position data;
    controlling a display located in a second volume, different to the first volume, to display a representation of at least a portion of the operator within a representation of at least a portion of the first volume, using the determined position of the operator within the three dimensional model of the first volume, wherein the position and orientation of the representation of the portion of the operator within the representation of the portion of the first volume correspond to the position and orientation of the operator within the first volume;

determining positions and orientations of a plurality of body parts of the operator, the representation of the portion of the operator is displayed such that positions and orientations of a corresponding plurality of body parts of the representation of the portion of the operator are displayed in correspondence to the determined positions and orientations of the plurality of body parts of the operator;

receiving user input data from a user input device located in the second volume; and controlling a first device located at the first volume, using the received user input data, to perform a first action.

16. The method as claimed in claim 15, further comprising controlling a second device at the first volume, using the received user input data, to perform a second action, different to the first action.

17. The method as claimed in claim 15, further comprising receiving environment data associated with the first volume.

18. The method as claimed in claim 15, further comprising:
    receiving further user input data requesting information concerning a process to be performed by the operator;
    retrieving process information using the further user input data; and
    controlling the display to display the retrieved process information.

19. The method as claimed in claim 15, further comprising:
    receiving additional user input data requesting a computer aided design (CAD) model of an article located within the first volume;
    retrieving the requested computer aided design (CAD) model using the additional user input data; and
    controlling the display to display at least a part of the retrieved computer aided design (CAD) model.

20. A non-transitory computer readable storage medium comprising computer readable instructions that, when executed by a computer, cause performance of the method as claimed in claim 15.

* * * * *